(12) United States Patent
Osawa et al.

(10) Patent No.: US 7,988,800 B2
(45) Date of Patent: Aug. 2, 2011

(54) METHOD FOR PRODUCING MG-REM-NI BASED HYDROGEN-ABSORBING ALLOY

(75) Inventors: Masahito Osawa, Yamagata (JP); Katsuyuki Kudo, Yamagata (JP); Akihito Maeda, Yamagata (JP); Seiji Takahashi, Yamagata (JP)

(73) Assignee: Japan Metals and Chemicals Co., Ltd., Tokyo (JP)

( * ) Notice: Subject to any disclaimer, the term of this patent is extended or adjusted under 35 U.S.C. 154(b) by 368 days.

(21) Appl. No.: 10/598,082

(22) PCT Filed: Feb. 21, 2005

(86) PCT No.: PCT/JP2005/003229
§ 371 (c)(1),
(2), (4) Date: Nov. 27, 2006

(87) PCT Pub. No.: WO2005/080617
PCT Pub. Date: Sep. 1, 2005

(65) Prior Publication Data
US 2007/0119524 A1     May 31, 2007

(30) Foreign Application Priority Data
Feb. 20, 2004   (JP) ................... 2004-045099

(51) Int. Cl.
*C22F 1/10* (2006.01)
*C22C 19/03* (2006.01)
(52) U.S. Cl. .............. 148/555; 420/455; 420/900
(58) Field of Classification Search .......... 148/555; 420/455, 900
See application file for complete search history.

(56) References Cited

U.S. PATENT DOCUMENTS

| 6,130,006 | A | 10/2000 | Kohno et al. |
| 6,214,492 | B1 | 4/2001 | Kohno et al. |
| 2002/0197181 | A1 | 12/2002 | Osawa et al. |
| 2006/0073066 | A1 | 4/2006 | Osawa et al. |

FOREIGN PATENT DOCUMENTS

| JP | 54-128931 | | 10/1979 |
| JP | 9-125172 | | 5/1997 |
| JP | 11-323469 | | 11/1999 |
| JP | 2001-226722 | | 9/2001 |
| JP | 2001262247 | A * | 9/2001 |
| JP | 2002-050351 | | 2/2002 |

OTHER PUBLICATIONS

English language Abstract of JP 54-128931, Oct. 5, 1979.
English language Abstract of JP2001-226722, Sep. 26, 2001.
English language Abstract of JP2001-262247, Sep. 26, 2001.
English language Abstract of JP 11-323469, Nov. 26, 1999.

* cited by examiner

*Primary Examiner* — Roy King
*Assistant Examiner* — Caitlin Fogarty
(74) *Attorney, Agent, or Firm* — Greenblum & Bernstein, P.L.C.

(57) ABSTRACT

In order to accurately and efficiently alloy a Mg-REM-Ni based hydrogen-absorbing alloy in accordance with a target composition, which was difficult in the industrial production by the conventional technique, a rare earth element starting material and a nickel starting material are firstly melted in a melting furnace to form a melt of REM-Ni alloy, and then a magnesium starting material is added to the alloy melt and an interior of the melting furnace is kept at a given pressure to form a melt of Mg-REM-Ni alloy, and thereafter the alloy melt is cooled and solidified at a given cooling rate to produce a Mg-REM-Ni based hydrogen-absorbing alloy.

6 Claims, 1 Drawing Sheet

METHOD FOR PRODUCING MG-REM-NI BASED HYDROGEN-ABSORBING ALLOY

INDICATION OF THE RELATED APPLICATION

The present application is an application claiming priority of JP 2004-45099 filed on Feb. 20, 2004.

TECHNICAL FIELD

This invention relates to a method for easily and efficiently producing a Mg-REM-Ni based hydrogen-absorbing alloy which is difficult in the industrial production.

BACKGROUND ART

The hydrogen-absorbing alloy is noticed as an energy-converting material and an energy storing material because it has a property capable of safely and easily absorbing hydrogen. Further, the hydrogen-absorbing alloy is utilized in the following various fields as one of new functional materials.
(1) storage-transport of hydrogen, storage-transport of heat
(2) conversion of heat-mechanical energy
(3) separation-purification of hydrogen
(4) separation of hydrogen isotope
(5) cell containing hydrogen as an active substance
(6) catalyst in synthetic chemistry
(7) Temperature sensor.

Thus, the hydrogen-absorbing alloy has a possibility for various mechanical, physical and chemical applications, so that it is a very important material as one of key materials in the future and novel industries.

Particularly, a nickel-hydrogen secondary cell using the hydrogen-absorbing alloy as a negative electrode material is noticed as a next-generation commercial cell. Because, the nickel-hydrogen secondary cell has merits that (a) it is high in the capacity, (b) it is strong to the over-charge and over-discharge, (c) high charge-discharge are possible, (d) it is clean, (e) it is inter-exchangeable with a nickel-cadmium cell, and the like.

The hydrogen-absorbing alloy means a metal or an alloy capable of forming a stable compound with hydrogen, which includes a single type of Pd, Ti, Zr, V, a rare earth metal element (hereinafter abbreviated as REM simply), an alkaline earth element or the like, and an alloy type of forming an alloy with such a metal element and the other metal element.

Among them, the alloy type has features that (i) the bonding force between metal and hydrogen is properly weakened to relatively easily conduct not only the absorption reaction of hydrogen but also the dissociation reaction; (ii) the magnitude of equilibrium hydrogen pressure required for absorption-discharge reaction (plateau pressure), breadth of equilibrium region (plateau region), change of equilibrium pressure in the course of absorbing hydrogen (flatness) and the like are easily improved; (iii) the chemical and physical stabilities are high; and the like. Moreover, as the alloy type hydrogen-absorbing alloy are known a rare earth system (LaNi$_5$, MmNi$_5$ or the like), a Laves system (ZrV$_2$, ZrMn$_2$ or the like), a titanium system (TiNi, TiFe or the like), a Mg system (Mg$_2$Ni, MgNi$_2$ or the like) and Mg-REM-Ni alloy.

As regards the above alloy type hydrogen-absorbing alloy, the rare earth based hydrogen-absorbing alloy such as LaNi$_5$, MmNi$_5$ or the like is used as an electrode material for a cell. However, the conventional rare earth based hydrogen-absorbing alloy has a discharge capacity previously exceeding 80% of theoretical capacity, so that there is a limit in the increase of the capacity at the present time. Under such a situation, JP-A-H11-323469 discloses that the Mg-REM-Ni based alloys are noticed as a hydrogen-absorbing alloy effective for further increasing the capacity and it is expected to increase the demand thereof in future.

DISCLOSURE OF THE INVENTION

The conventional Mg-REM-Ni based alloy has been produced by charging a mixture of magnesium starting material, rare earth element starting material and nickel starting material into a melting furnace at once and melting it.

However, the melting points of La as a rare earth element and Ni are 921° C. and 1450° C., respectively, while the melting point of Mg is 650° C. and the boiling point thereof is extremely low as 1090° C. Therefore, there is a problem that if it is intended to melt these Mg, REM and Ni together in the melting furnace, Mg having a lower melting point is first melted and settled to the bottom of the melting furnace (crucible), while as the temperature becomes higher by heating, it evaporates before the melting of Ni and hence the resulting alloy becomes unhomogeneous. That is, when the hydrogen-absorbing alloy is produced by the usual melting method, there is a problem that the melt of the homogeneous alloy can not be formed but also the amount of Mg required for the formation of the alloy having a target composition can no be ensured because Mg evaporates.

In order to solve this problem, there has hitherto been attempted a method wherein an extra amount of Mg corresponding to a loss amount fur to evaporation is previously added. In this method, however, the amount of Mg lost through evaporation changes in accordance with the melting condition and hence the alloy having a given composition can not be surely obtained, so that this method is not actually a ultimate solution.

It is an object of the invention to provide a method wherein a Mg-REM-Ni based hydrogen-absorbing alloy having a good crystallinity and a homogeneous composition can be accurately alloyed and produced easily and efficiently.

The inventors have made studies for achieving the above object and found that it is advantageous to produce the hydrogen-absorbing alloy through the following three steps and as a result, the invention has been accomplished. That is, the production of the hydrogen-absorbing alloy according to the invention is characterized by comprising a first step of melting a rare earth element starting material having a low evaporation pressure and a nickel starting material in a melting furnace to obtain a melt of REM-Ni alloy:

a second step of adding magnesium starting material to the melt of REM-Ni alloy and keeping a pressure inside the melting furnace at a given level to obtain a melt of Mg-REM-Ni alloy; and a third step of cooling and solidifying the melt of Mg-REM-Ni alloy at a given cooling rate.

In this production method, it is effective that the temperature of the melt of REM-Ni alloy at the addition of the magnesium starting material is 1250-1400° C. at the second step, that the pressure inside the melting furnace after the addition of the magnesium starting material is kept at not more than 500 Torr at the second step, and that the cooling rate in the cooling and solidifying the melt of Mg-REM-Ni alloy is 50-500° C./sec at the third step.

In the invention, a typical example of the target composition of the alloy is, for example, Mg:0.3-REM:0.7-Ni:3.3 or Mg:0.3-REM:0.7-Ni:2.8-Co:0.5 as a composition ratio.

According to the invention, the Mg-REM-Ni based hydrogen-absorbing alloy having a good crystallinity or a homogeneous alloy composition as a whole can be accurately alloyed into an expected target composition and can be produced and easily and efficiently. Particularly, according to the invention, the amount of Mg to be targeted can be accurately controlled without requiring the complicated step of adding magnesium starting material for supplementing the loss of magnesium due to the evaporation.

BEST MODE FOR CARRYING OUT THE INVENTION

Figure 1:
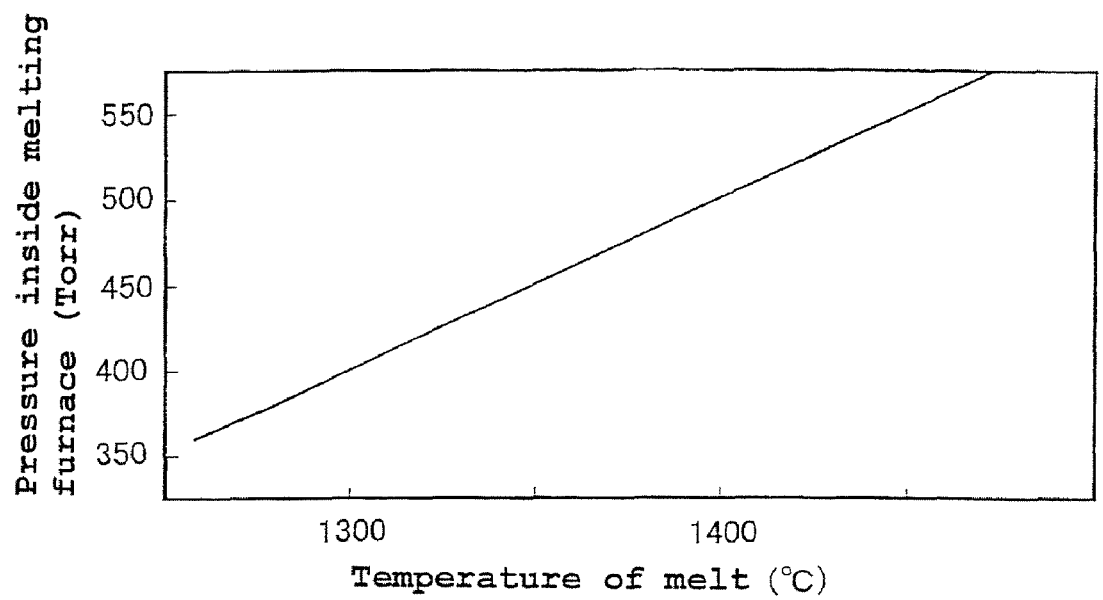
FIG. 1 is a graph showing a relation between a pressure inside a melting furnace and a temperature of a melt.

The Mg-REM-Ni based hydrogen-absorbing alloy obtained by the production method of the invention comprises Mg, REM and Ni as an essential component. Moreover, as REM can be used La but also LaCe, Pr, Nd, Sm, Gd, Dy, Er, Yb and the like. Also, the alloy may contain an alloy-formable metal in addition to the above essential components. For example, there can be used at least one element selected from calcium, strontium, yttrium, cobalt, manganese, aluminum, iron, copper, zinc, silicon, tin, zirconium and the like.

The Mg-REM-Ni based hydrogen-absorbing alloy according to the invention is mainly produced through the following first step, second step and third step.

In the first step, the rare earth element starting material and the nickel starting material are first charged into a melting furnace (crucible) such as a high frequency induction melting furnace, a vacuum melting furnace or the like. In this case, the nickel starting material may be added so that the rare earth element starting material and a part of the nickel starting material are mixed and melted and then the remaining part of the nickel starting material is gradually added and melted without charging the all of the given amount at once.

In case of using the other alloy-formable metals, it is preferable that a metal having properties of boiling point and the like close to Mg such as calcium, strontium or the like, or an element having a high vapor pressure such as barium or the like is charged into the melting furnace (crucible) together with the magnesium starting material, while an element having properties of boiling point and the like close to the rare earth element or nickel rather than Mg such as cobalt, aluminum or the like is charged into the melting furnace (crucible) together with the rare earth element or nickel starting material.

Moreover, it is preferable at the first step that after the inside of the melting furnace is rendered into vacuum, an inert gas such as argon gas or the like is introduced to adjust a pressure inside the furnace to about 200-300 Torr. Because, the impurity gas component is sufficiently removed under vacuum to prevent the violent boiling.

The starting materials charged into the melting furnace are dissolved through induction heating to form a melt of REM-Ni alloy. In the induction heating, it is preferable to heat the starting materials charged into the melting furnace to not lower than 1400° C. When the temperature is lower than 1400° C., the starting materials charged into the melting furnace can not be rendered into a homogeneous alloy melt. Moreover, when it exceeds 1550° C., the service life of the crucible is shortened.

At the second step, a magnesium starting material is added to the melt of REM-Ni alloy obtained in the melting furnace at the first step so as to have a given composition ratio. At this step, the magnesium starting material immediately melts because the temperature of the REM-Ni allot melt is sufficiently high.

When the magnesium starting material is added, it is preferable that the temperature inside the melting furnace is made to 1250-1400° C. When the temperature is lower than 1250° C., the solidification of the REM-Ni based alloy starts, while when it exceeds 1400° C., the loss of Mg due to evaporation increases. Moreover, the temperature inside the melting furnace is more preferable to be 1270-1370° C. because the shelfing of the magnesium starting material can be prevented to suppress the loss of Mg due to the evaporation.

In this case, the temperature of the melt is required to be kept within the above temperature range even after the addition of the magnesium starting material. However, the inside of the furnace after the addition of Mg is filled with the Mg vapor, so that it is very difficult to visually confirm the temperature of the melt by inserting a thermocouple or the like into the melt. In the invention, therefore, the pressure inside the melting furnace is controlled instead that the temperature inside the melting furnace is kept within the above temperature range to provide substantially the same melting condition as in the temperature range.

Moreover, FIG. 1 is a graph showing a relation between the pressure inside the melting furnace and the temperature of the melt. That is, when the pressure inside the furnace is controlled by an output load of the melting furnace for controlling the temperature of the melt to the above range, the temperature of the melting atmosphere can be naturally controlled to the above range, which renders the control of accurate magnesium composition. In this case, the pressure inside the furnace corresponding to the temperature range is 350-500 Torr as seen from FIG. 1.

Finally, at the third step, the melt of Mg-REM-Ni alloy obtained at the second step is cooled and solidified. The cooling and solidification is preferable to be carried out on a water-cooled platen. The cooling is preferable to be carried out at a cooling rate of 50-500° C./sec for cooling and solidification. When it is less than 50° C./sec, the segregation of the alloy components is caused and the hydrogen absorbing property may be not developed sufficiently. While, when it exceeds 500° C./sec, the crystal structure of the alloy is disordered and the good hydrogen absorbing property may not be developed. Moreover, in order to prevent the segregation of the alloy components and develop the hydrogen absorbing property, it is preferable that the cooling rate is within a range of 100-300° C./sec.

A typical target composition of the thus produced Mg-REM-Ni based hydrogen-absorbing alloy is preferable to have Mg:0.3-REM:0.7-Ni:3.3 or Mg:0.3-REM:0.7-Ni:2.8-Co:0.5 as a composition ratio.

The invention is explained with reference to the comparison between example and comparative example.

Example 1

There is provided 12 kg in total of La (purity: 99.9%), Mg (purity: 99.9%) and Ni (purity: 99.9%). At first, full amounts of La and Ni are charged into a high frequency induction melting furnace (crucible) and an interior of the furnace is rendered into 0.1 Torr and then an Ar gas is introduced up to 260 Torr. Next, the heating is started to melt La and Ni in the melting furnace. After the heating is continued so that the temperature inside the melting furnace reaches to 1450° C., the melt is cooled to a temperature of 1350° C. After it is confirmed that the temperature of the melt is 1350° C., full amount of Mg is added to the alloy melt in the melting furnace (crucible), and the temperature of the melt is kept at 1350° C. while monitoring the pressure inside the furnace and such a melting operation is continued for 10 minutes. Then, the resulting alloy melt is cooled and solidified on a water-cooled platen under a condition of cooling rate of 150° C./sec. This treatment of producing the alloy is repeated 3 times, and the composition is measured by an ICP spectral analysis to obtain results as shown in Table 1. Although the target alloy composition is La:0.7-Mg:0.3-Ni:3.3, the composition close to the target alloy composition is obtained in a high accuracy in this example of the invention (composition ratio of Mg is within ±5%).

Comparative Example 1

There is provided 12 kg in total of La, Mg and Ni compounded in the same manner as in Example 1. The full amounts of them are charged into a high frequency induction melting furnace (crucible), and an interior of the furnace is rendered into 0.1 Torr, and Ar gas is introduced up to 260 Torr. Thereafter, the induction heating is continued for about 60 minutes, and at a time that the temperature of the melt reaches to 1350° C., the resulting alloy melt is cooled and solidified on a water-cooled platen. The above alloy preparation is repeated 3 times and a composition is measured through an ICP spectral analysis. The results are shown in Table 1.

TABLE 1

Composition of Mg-Rare Earth Element-Ni based hydrogen-absorbing alloy (mass %)

|  | La | Mg | Ni |
|---|---|---|---|
| Target | 32.61(0.7) | 2.45(0.3) | 64.94(3.3) |
| Example 1 | 32.54(0.697) | 2.47(0.303) | 64.99(3.297) |
|  | 32.64(0.702) | 2.42(0.298) | 64.94(3.308) |
|  | 32.69(0.701) | 2.44(0.299) | 64.87(3.292) |
| Comparative | 33.02(0.781) | 1.62(0.219) | 65.36(3.659) |
| Example 1 | 33.29(0.832) | 1.18(0.168) | 65.53(3.874) |
|  | 32.87(0.749) | 1.93(0.251) | 65.20(3.515) |

*Numerical value in parenthesis is a composition ratio.

Example 2

There is provided 12 kg in total of La (purity: 99.9%), Mg$_2$Ni (purity: 99.9%), Ni (purity: 99.9%) and Co (purity: 99.9%). At first, the full amounts of La, Ni and Co are charged into a high frequency induction melting furnace (crucible), and an interior of the furnace is rendered into 0.1 Torr, and Ar gas is introduced up to 260 Torr. Then, the heating is started to melt the starting materials in the melting furnace. After the heating is conducted so that the temperature inside the melting furnace reaches to 1450° C., the temperature of the melt is cooled to 1350° C. After it is confirmed that the temperature of the melt is 1350° C., the full amount of Mg$_2$Ni is added to the alloy melt in the melting furnace (crucible), and the temperature of the melt is kept at a given value (1350° C.) while monitoring the pressure inside the furnace, and the melting operation is continued for 10 minutes. Thereafter, the resulting alloy melt is cooled and solidified on a water-cooled platen at a cooling rate of 150° C./sec. Such an alloy preparation treatment is repeated 3 times, and a composition is measured through an ICP spectral analysis to obtain results as shown in Table 2. Although the target alloy composition is La:0.7-Mg:0.3-Ni:2.8-Co:0.5, the composition close to the target alloy composition can be obtained in a high accuracy in this example of the invention (composition ratio of Mg is within ±5%).

Comparative Example 2

There is provided 12 kg in total of La, Mg$_2$Ni and Ni compounded in the same manner as in Example 2. The full amounts of them are charged into a high frequency induction melting furnace (crucible), and an interior of the furnace is rendered into 0.1 Torr, and Ar gas is introduced up to 260 Torr. Thereafter, the heating is started to melt the starting materials in the melting furnace and continued so that the temperature inside the melting furnace reaches to 1450° C. Then, the full amount of Mg$_2$Ni is added to the alloy melt in the melting furnace (crucible). At this time, the pressure inside the furnace rises to about 550 Torr, but the melting operation is continued for 10 minutes. Thereafter, the resulting alloy melt is cooled and solidified on a water-cooled platen at a cooling rate of 150° C./sec. The composition of the resulting alloy is measured through an ICP spectral analysis. The result is shown in Table 2.

TABLE 2

Composition of Mg-Rare Earth Element-Ni based hydrogen-absorbing alloy (mass %)

|  | La | Mg | Ni | Co |
|---|---|---|---|---|
| Target | 32.59(0.7) | 2.44(0.3) | 55.09(2.8) | 9.88(0.5) |
| Example 2 | 32.61(0.701) | 2.43(0.299) | 55.06(2.803) | 9.90(0.502) |
|  | 32.53(0.698) | 2.46(0.302) | 55.14(2.801) | 9.87(0.499) |
|  | 32.56(0.702) | 2.42(0.298) | 55.16(2.814) | 9.86(0.501) |
| Comparative Example 2 | 33.18(0.814) | 1.33(0.186) | 55.54(3.223) | 9.95(0.575) |

*Numerical value in parenthesis is a composition ratio.

As seen from Tables 1 and 2, according to the method of the invention, it is possible to produce the alloys having a target composition while controlling the scattering. On the contrary, the loss of Mg due to evaporation can not be controlled in the method of the comparative example, and the composition is largely scattered from the target one, and the scattering of the alloy composition is caused.

INDUSTRIAL APPLICABILITY

The technique relating to the invention is utilized in a field required that a negative electrode material of a nickel-hydrogen secondary battery noticed as a next-generation consumer battery or a material used for a hydrogen-storage tank or the like can be produced accurately and efficiently.

The invention claimed is:
1. A method of producing a Mg-REM-Ni based hydrogen-absorbing alloy, comprising a first step of melting a rare earth element starting material having a low evaporation pressure and a nickel starting material in a melting furnace to obtain a melt of REM-Ni alloy; a second step of adding magnesium starting material to the melt of REM-Ni alloy wherein the temperature of the melt of REM-Ni alloy at the addition of the magnesium starting material is 1250-1400° C., the magnesium starting material comprising elemental Mg or Mg$_2$Ni, and keeping a pressure inside the melting furnace after the addition of the magnesium starting material at a pressure of 350-500 Torr to obtain a melt of Mg-REM-Ni alloy; and a third step of cooling and solidifying the melt of Mg-REM-Ni alloy at a given cooling rate.

2. A method according to claim 1, wherein the cooling rate in the cooling and solidifying the melt of Mg-REM-Ni alloy is 50-500° C./sec at the third step.

3. A method according to claim 1, wherein the magnesium starting material is elemental Mg.

4. A method according to claim 2, wherein the magnesium starting material is elemental Mg.

5. A method according to claim 1, wherein the magnesium starting material is $Mg_2Ni$.

6. A method according to claim 2, wherein the magnesium starting material is $Mg_2Ni$.

* * * * *